(12) United States Patent
Nagatani

(10) Patent No.: US 8,073,957 B2
(45) Date of Patent: Dec. 6, 2011

(54) COMMUNICATION CONTROL SYSTEM

(75) Inventor: Hiroyuki Nagatani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 238 days.

(21) Appl. No.: 12/506,522

(22) Filed: Jul. 21, 2009

(65) Prior Publication Data

US 2009/0282153 A1    Nov. 12, 2009

Related U.S. Application Data

(63) Continuation of application No. PCT/JP2007/000225, filed on Mar. 14, 2007.

(51) Int. Cl.
    *G06F 15/16* (2006.01)
(52) U.S. Cl. .................. 709/227; 709/228; 709/229
(58) Field of Classification Search .................. 709/228, 709/227, 229
    See application file for complete search history.

(56) References Cited

U.S. PATENT DOCUMENTS

| 2004/0105420 | A1* | 6/2004 | Takeda et al. | 370/349 |
| 2005/0172026 | A1* | 8/2005 | Jeon et al. | 709/228 |

FOREIGN PATENT DOCUMENTS

| JP | 10-190723 | 7/1998 |
| JP | 2000-183971 | 6/2000 |
| JP | 2002-152253 | 5/2002 |
| JP | 2004-363685 | 12/2004 |

OTHER PUBLICATIONS

International Search Report for PCT/JP2007/000225, mailed Jun. 19, 2007.

* cited by examiner

*Primary Examiner* — Kyung H Shin
(74) *Attorney, Agent, or Firm* — Staas & Halsey LLP

(57) ABSTRACT

A communication control system for intervening in the communication between a PC terminal in an external network and a portable telephone terminal with an electronic mail transmission/reception function in a mobile communication network has a database in which a portable telephone number and a mail account are stored in association with each other. Upon receipt of an access request with an FQDN to a predetermined portable telephone terminal from the PC terminal, the communication control system solves the name of the portable telephone terminal by searching the database on the basis of a host name (mail account name) extracted from the FQDN to acquire the telephone number corresponding to the host name (mail account name) as address information, thereby making a connection of the communication to the mobile communication terminal on the basis of the address information acquired by solving the name.

9 Claims, 11 Drawing Sheets

| RECORD No. | TELEPHONE NUMBER | MAIL ACCOUNT | HOST NAME |
|---|---|---|---|
| RECORD 1 | 090-cccc-oooo | abcd | eee |
| RECORD 2 | 090-gggg-hhhh | efg | mnop |
| RECORD 3 | 090-kkkk-nnnn | hijkl | rst |

FIG. 1

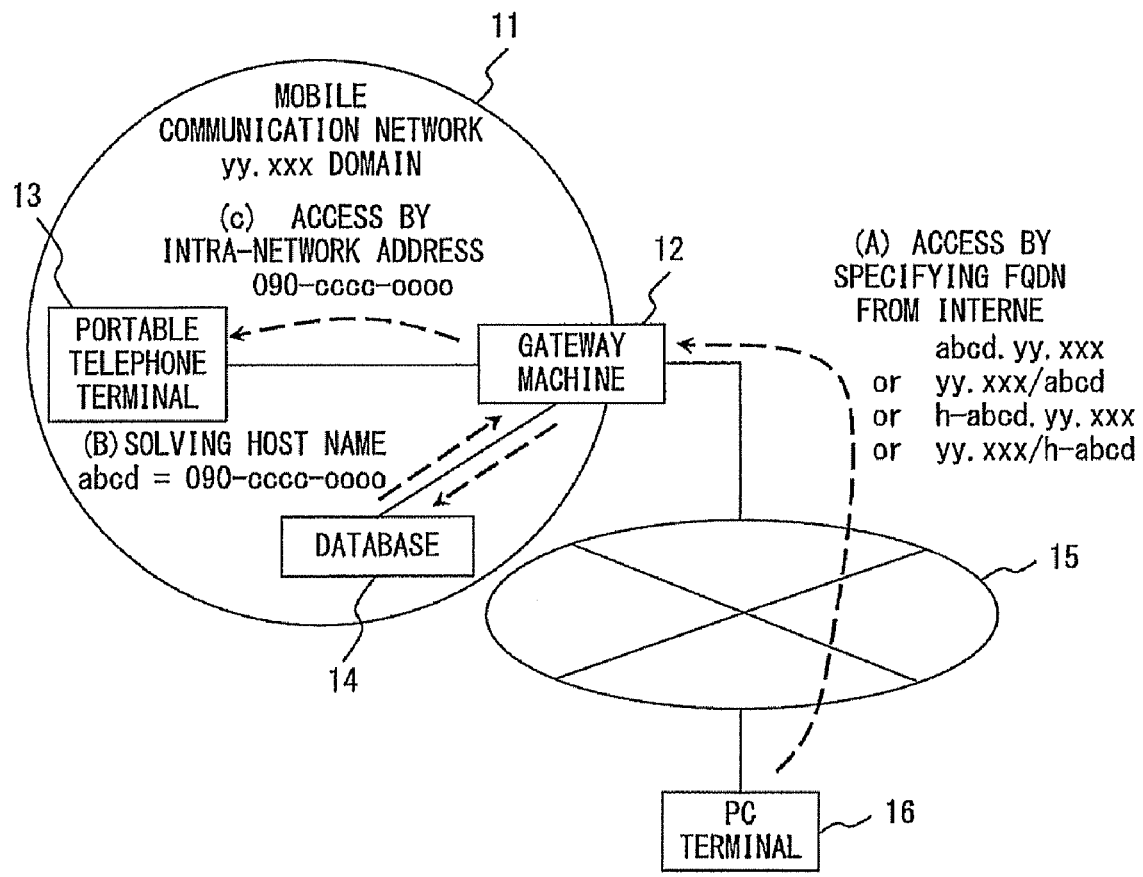
F I G. 3

| RECORD No. | TELEPHONE NUMBER | MAIL ACCOUNT |
|---|---|---|
| RECORD 1 | 090-cccc-oooo | abcd |
| RECORD 2 | 090-gggg-hhhh | efg |
| RECORD 3 | 090-kkkk-nnnn | hijkl |

FIG. 4

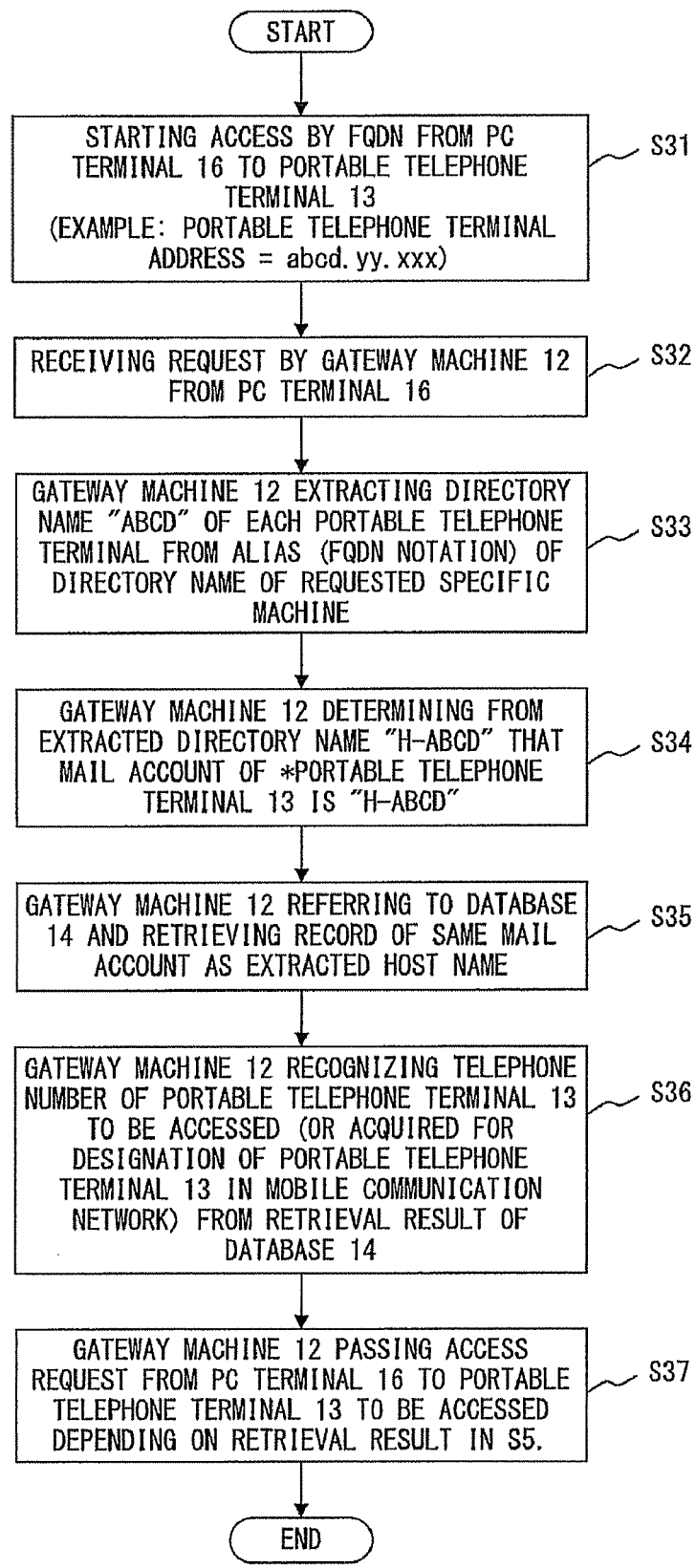
F I G. 8

| RECORD No. | TELEPHONE NUMBER | MAIL ACCOUNT |
|---|---|---|
| RECORD 1 | 090-cccc-oooo | abcd |
| RECORD 2 | 090-gggg-hhhh | efg |
| RECORD 3 | 090-kkkk-nnnn | hijkl |

ASSIGNING UNIFORM CHARACTER STRING ⬇

| RECORD No. | TELEPHONE NUMBER | MAIL ACCOUNT | HOST NAME (OR DIRECTORY NAME) |
|---|---|---|---|
| RECORD 1 | 090-cccc-oooo | abcd | h-abcd |
| RECORD 2 | 090-gggg-hhhh | efg | h-efg |
| RECORD 3 | 090-kkkk-nnnn | hijkl | h-hijkl |

F I G. 9

COMMUNICATION CONTROL SYSTEM

CROSS-REFERENCE TO RELATED APPLICATION

This application is a continuation application of International PCT Application No. PCT/JP2007/000225, filed on Mar. 14, 2007, the entire contents of which are incorporated herein by reference.

FIELD

The present invention relates to a system capable of accessing a mobile communication terminal in a mobile communication network from an external network by specifying an FQDN (fully qualified domain name).

BACKGROUND

Generally when a terminal such as a personal computer (hereinafter referred to as a PC) etc. accesses any network resource (a machine on the network), the URI (uniform resource identifier) of the machine is specified by the FQDN (fully qualified domain name). For example, when a PC accesses a Web server having the machine name "www" located in the domain "fujitsu.com", it is common to specify the name www.fujitsu.com to access the server.

There is a system capable of accessing a machine from an external network by specifying the FQDN in a method similar to the method described above when a portable telephone terminal in a mobile communication network is assumed as the machine on the network. In this system, it is necessary to assign a host name to each portable telephone terminal (for example, patent document 1).

However, since the portable telephone terminal itself has not joined the IP network, a database is required to convert a "host name" into an "intra-network address of the terminal" (to solve the name) in the mobile communication network.

As the prior art technology, there is a system of defining a telephone number as a host name in the IP telephone system. However, the system has the disadvantages that the host name cannot be changed for a user convenience, and it is hard for a user to discriminate the host name.

In addition, when a unique host name other than a telephone number is newly defined, it is necessary to add a "host name" field to an existing database having a "telephone number" field and a "mail account" field as illustrated in FIG. 1. Furthermore, it is also necessary to separately provide a device for adding a host name field to a record when a name not automatically generated from existing unique information (a mail account etc.) is set as a host name, and to provide the device for a user. Then, there is an increasing number of steps to be performed to use the system.

Patent Document 1: Japanese Laid-open Patent Publication No. 2002-152253

SUMMARY

It is an object of the present invention to assign the name of a mobile communication terminal on the basis of the existing unique information that can be arbitrarily changed by a user to each mobile communication terminal in a mobile communication network so that an external network can access each mobile communication terminal by specifying the FQDN.

A communication control system which intervenes in the communication between an external terminal in an external network and a mobile communication terminal in the mobile communication network includes: an access request acquisition device for designating the location of a mobile communication terminal to be accessed in the mobile communication network from the external terminal to a predetermined mobile communication terminal by acquiring an access request by a fully qualified domain name (FQDN) in which location information including the name of the mobile communication terminal is specified; a mobile communication terminal name extraction device for extracting the name of the mobile communication terminal from the FQDN; a name solving device for solving the name of the mobile communication terminal on the basis of the extracted name of the mobile communication terminal; and an access destination communication device for connecting communications to the mobile communication terminal according to address information acquired by solving the name.

With the above-mentioned configuration, an external network can access a mobile communication object in a mobile communication network by specifying the FQDN.

In the communication control system, the mobile communication terminal is a portable telephone terminal with an electronic mail transmission/reception function.

With the above-mentioned configuration, an external network can access a mobile communication object in a mobile communication network by specifying the FQDN.

The communication control system further includes a mobile communication terminal-related information storage device storing the mail account name of the electronic mail of the portable telephone terminal and the telephone number of the portable telephone terminal corresponding to the mail account name.

With the configuration, the name solving process can be performed on the address in the mobile communication network, and the mail account is used in the name solving process, thereby setting a host name by a user.

In the communication control system, when the setting condition is that the name of the mobile communication terminal is the same as the mail account corresponding to the name of the mobile communication terminal, the mobile communication terminal name extraction device extracts the host name of the FQDN as the name of the mobile communication terminal, and the name solving device acquires the telephone number corresponding to the name of the mobile communication terminal extracted from the mobile communication terminal-related information storage device as the address information.

With the above-mentioned configuration, the name solving process can be performed on the address in the mobile communication network of the portable telephone terminal from the host name of the FQDN.

In the communication control system, if the setting condition is that the FQDN is the information specified by the directory name of a predetermined device described in path notation, and the name of the mobile communication terminal is the same as the mail account name corresponding to the name of the mobile communication terminal, then the mobile communication terminal name extraction device extracts the lowest order directory name of the path as the name of the mobile communication terminal, and the name solving device acquires the telephone number corresponding to name of the mobile communication terminal as the address information.

With the above-mentioned configuration, although the FQDN is specified by the directory name of a predetermined device described in path notation, the present invention can be applied.

A non-transitory computer-readable portable storage medium, on which is stored a communication control program for enabling a computer to execute the communication control process of intervening in the communication between an external terminal in an external network and a mobile communication terminal in the mobile communication network, the program includes: an access request acquiring process of designating the location of a mobile communication terminal to be accessed in the mobile communication network from the external terminal to a predetermined mobile communication terminal by acquiring an access request by a fully qualified domain name (FQDN) in which location information including the name of the mobile communication terminal is specified; a mobile communication terminal name extracting process of extracting the name of the mobile communication terminal from the FQDN; a name solving process of solving the name of the mobile communication terminal on the basis of the extracted name of the mobile communication terminal; and an access destination communicating process of connecting communications to the mobile communication terminal according to address information acquired by solving the name.

With the above-mentioned configuration, an external network can access a mobile communication object in a mobile communication network by specifying the FQDN.

A communication control method for intervening in the communication between an external terminal in an external network and a mobile communication terminal in the mobile communication network includes: designating the location of a mobile communication terminal to be accessed in the mobile communication network from the external terminal to a predetermined mobile communication terminal by acquiring an access request by a fully qualified domain name (FQDN) in which location name information designating the location name of the mobile communication terminal is specified; extracting the name of the mobile communication terminal from the FQDN; solving the name of the mobile communication terminal on the basis of the extracted name of the mobile communication terminal; and connecting communications to the mobile communication terminal according to address information acquired by solving the name.

With the above-mentioned configuration, an external network can access a mobile communication object in a mobile communication network by specifying the FQDN.

BRIEF DESCRIPTION OF DRAWINGS

FIG. 1 illustrates the conventional data structure of the database in which a unique host name not a telephone number is newly defined;

FIG. 3 is an example of a use environment and the flow chart of access according to the present invention;

FIG. 4 is an example of the data structure of a database 14 according to an embodiment of the present invention;

FIG. 8 is a flow chart of the name solving process according to the fourth embodiment;

FIG. 9 is an explanatory view of generating a host name (or directory name) field according to other embodiments;

DESCRIPTION OF EMBODIMENTS

Based on the existing unique information for which the function of arbitrarily changing by a user has been provided such as the account name of a mail address etc. assigned in advance to a portable telephone terminal as one of a mobile communication terminal, the present invention specifies a host name assigns a host name to each portable telephone terminal, and the assigned host name is specified to a portion as the host name or the directory name of the FQDN. Thus, a name can be solved using an existing field in a database when a gateway machine solves the name of an address.

Figure 2:
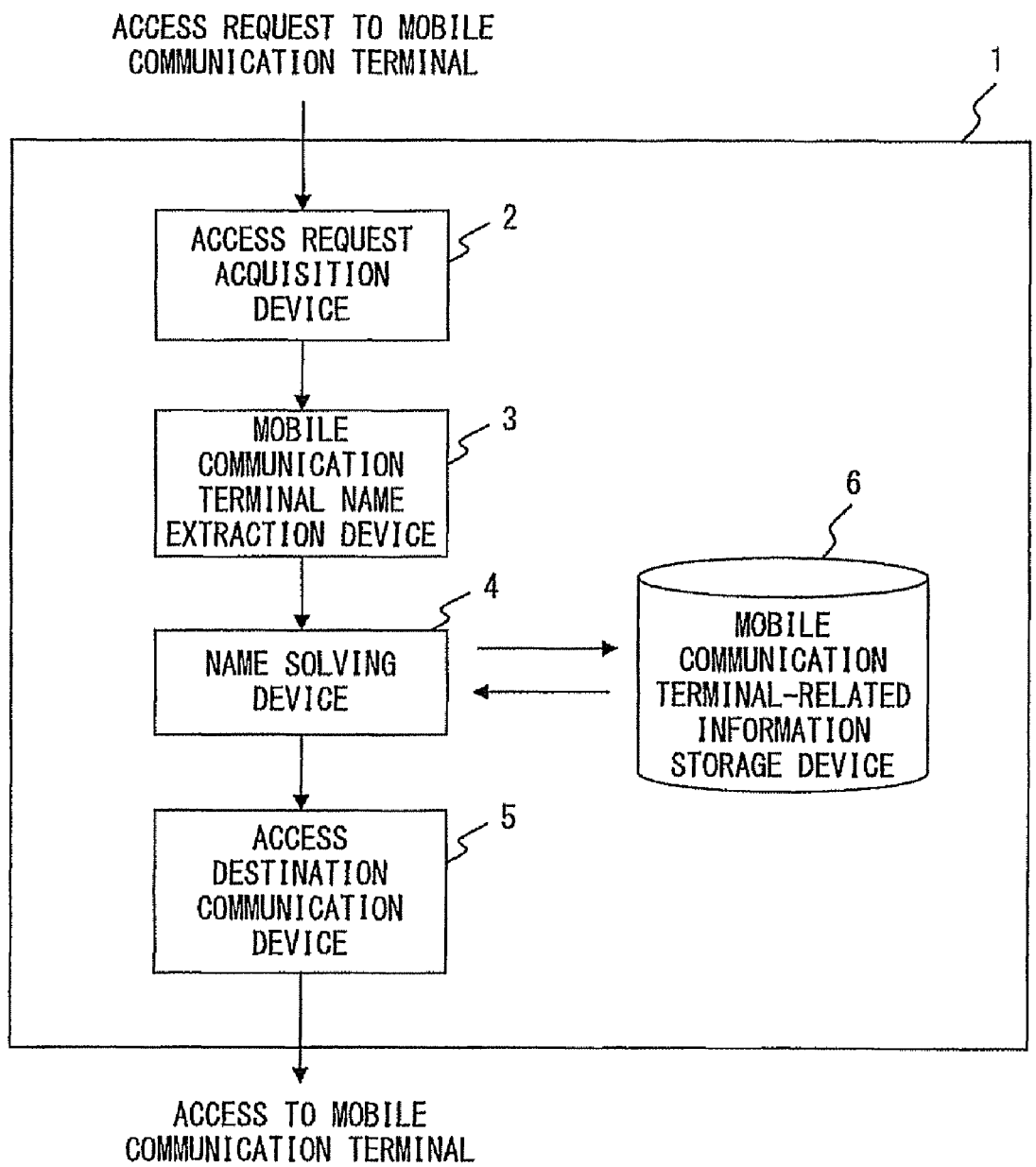
FIG. 2 illustrates the configuration of the concept of the communication control system according to the present invention.

FIG. 2 illustrates the configuration of the concept of the communication control system according to the present invention. A communication control system 1 intervenes in the communications between an external terminal in an external network and a mobile communication terminal in a mobile communication network.

The communication control system 1 is configured by an access request acquisition device 2, a mobile communication terminal name extraction device 3, a name solving device 4, an access destination communication device 5, and a mobile communication terminal-related information storage device 6.

The access request acquisition device 2 designates the location of a mobile communication terminal to be accessed in the mobile communication network from the external terminal to the mobile communication terminal by acquiring an access request by a fully qualified domain name (FQDN) in which the location information including the name of the mobile communication terminal is specified.

The mobile communication terminal name extraction device 3 extracts the name of the mobile communication terminal from the FQDN. The name solving device 4 refers to the mobile communication terminal-related information storage device 6 and solve the name of the mobile communication terminal on the basis of the name of the mobile communication terminal.

The access destination communication device 5 establish a communication to the mobile communication terminal according to the address information acquired by solving the name.

The mobile communication terminal is a portable telephone terminal with an electronic mail transmission/reception function. The mobile communication terminal-related information storage device 6 stores the mail account name of the electronic mail of the portable telephone terminal and the telephone number of the portable telephone terminal corresponding to the mail account name.

In the first embodiment of the present invention, when the setting condition is that the name of the mobile communication terminal is the same as the mail account name corresponding to the mobile communication terminal, the following process is performed. First, the mobile communication terminal name extraction device 3 extracts the host name of the FQDN as the name of the mobile communication terminal. Next, the name solving device 4 acquires the telephone number corresponding to the name of the mobile communication terminal extracted from the mobile communication terminal-related information storage device 6 as the address information.

Thus, the name can be solved from the host name of the FQDN to the address in the mobile communication network of the portable telephone terminal.

In the second embodiment of the present invention, when the setting condition is that the FQDN is the information specified by the directory name of a predetermined device described in path notation, and the name of the mobile communication terminal is the same as the mail account name corresponding to the name of the mobile communication terminal, the following process is performed. First, the mobile communication terminal name extraction device 3 extracts the lowest order directory name of the path as the name of the mobile communication terminal. Next, the name solving device 4 acquires the telephone number corresponding to the name of the mobile communication terminal extracted from the mobile communication terminal-related information storage device 6 as the address information.

Thus, the present invention can be applied although the FQDN is specified by a directory name of a predetermined device described in path notation.

In the third embodiment of the present invention, when the name of the mobile communication terminal is assigned one or more predetermined characters to the mail account name corresponding to the name of the mobile communication terminal, the following process is performed. First, the mobile communication terminal name extraction device 3 extracts the host name of the FQDN as the name of the mobile communication terminal. Next, the name solving device 4 removes the characters from the extracted name of the mobile communication terminal, acquires the mail account name, and acquires the telephone number corresponding to the mail account name as address information from the mobile communication terminal-related information storage device 6.

Thus, by the name of the portable telephone terminal equally assigned predetermined characters to the mail account, the mail account can be acquired from the name of the portable telephone terminal under the setting condition that the name of the portable telephone terminal does not match the mail account. Therefore, a telephone number can be acquired on the basis of the mail account.

In the fourth embodiment of the present invention, when the FQDN is information specified by a directory name of a predetermined device described in path notation and the name of the mobile communication terminal is assigned one or more predetermined characters to the mail account name corresponding to the mobile communication terminal, the following process is performed. First, the mobile communication terminal name extraction device 3 extracts the lowest order directory name of the path as the name of the mobile communication terminal. Next, the name solving device 4 removes the characters from the extracted name of the mobile communication terminal, acquires the mail account name, and acquires the telephone number corresponding to the mail account name as the address information from the mobile communication terminal-related information storage device 6.

Thus, although the FQDN is specified by the directory name of a predetermined device described in path notation, the present invention can be applied as in the third embodiment of the present invention.

Thus, in the embodiment of the present invention, a host name according to existing unique information that can be arbitrarily changed by a user can be assigned, and each portable telephone terminal can be accessed from an external network by specifying the FQDN.

FIG. 3 is an example of a use environment and the flow chart of access according to the present invention. A mobile communication network 11 is a network expressed by a domain name "yy.xxx". The mobile communication network 11 includes a gateway machine 12, a portable telephone terminal 13, and a database 14.

The portable telephone terminal 13 has a function of transmitting/receiving electronic mail. The mobile communication network 11 is connected to the Internet 15 as an external network through the gateway machine 12. A PC terminal 16 etc. is connected to the Internet 15.

FIG. 4 is an example of the data structure of the database 14 according to an embodiment of the present invention. The data structure in FIG. 4 is configured by a "record No." field, a "telephone number" field, and a "mail account" field.

The "record No." field stores a record No. The "telephone number" field stores the telephone number of a portable telephone terminal. The mail account stores the mail account name of electronic mail of the portable telephone terminal.

The embodiments of the present invention are described below in detail with reference to FIG. 3.

First Embodiment

In the network system according to the present embodiment in which communications can be performed by specifying a specific portable telephone terminal in a mobile communication network using an FQDN from a terminal in an external network, the name solving system in which the host name of the FQDN (that is, the mail account) is acquired by a gateway machine, and the FQDN is read (the name is solved) into the address in a mobile communication network when the setting condition is that the host name (machine name) of a portable telephone terminal is the same as the mail account name (before @) assigned to the portable telephone terminal is described below.

Figure 5:
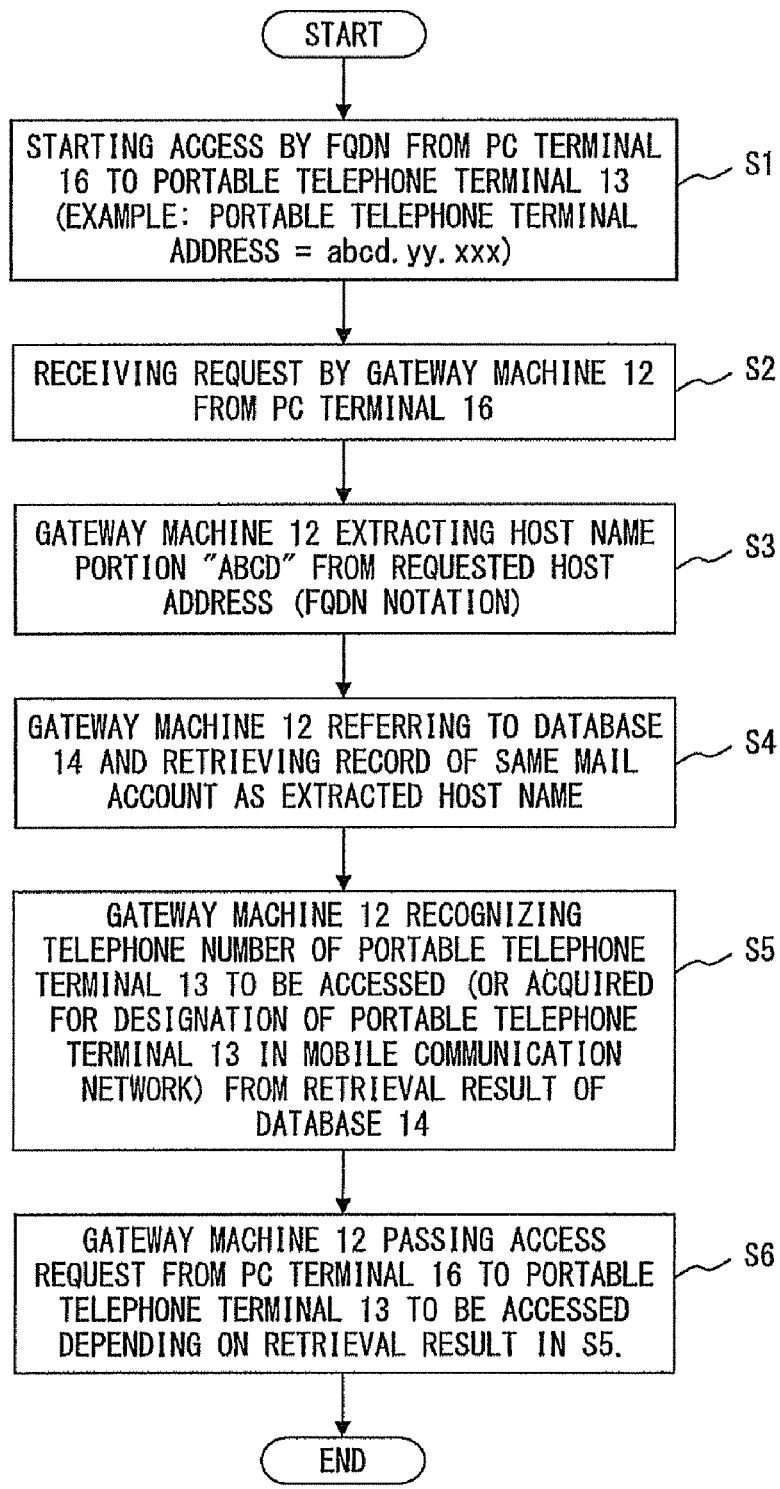
FIG. 5 is a flow chart of the name solving process according to the first embodiment.

FIG. 5 is a flow chart of the name solving process according to the present embodiment. The process in FIG. 5 is described below with reference to FIGS. 3 and 4.

In FIG. 3, first, the PC terminal 16 connected to the Internet 15 accesses (A) the portable telephone terminal 13 in the mobile communication network 11 by specifying the address ("abcd.yy.xxx") of the portable telephone terminal 13 by specifying the FQDN (step 1. Hereinafter, "S" refers to "step").

Then, the name of the domain is solved by the DNS (domain name system) server in the Internet 15. The PC terminal 16 is connected to the gateway machine 12. The gateway machine 12 receives a comparison result from the PC terminal 16 (S2).

The gateway machine 12 extracts a host name "abcd" from the address ("abcd.yy.xxx") of the access destination specified by the FQDN included in the connection request from the PC terminal 16 (S3).

Then, the gateway machine 12 refers to the database 14, and retrieves the record of the mail account having the same name as the host name "abcd" extracted in S3 (S4).

Then, the gateway machine 12 recognizes the telephone number (or the address for designation of the portable telephone terminal 13 in the mobile communication network 11) of the portable telephone terminal 13 to be accessed on the basis of the retrieval result (S5). Practically, the gateway machine 12 acquires the telephone number corresponding to the mail account name from the record retrieved using the host name (mail account name) "abcd" as a key in S4. Thus, the FQDN-specified address can be read into the address to be used in the mobile communication network 11.

Then, the gateway machine 12 is connected to the portable telephone terminal 13 to be accessed on the basis of the telephone number (or the address for designation of the portable telephone terminal 13 in the mobile communication network 11) acquired in S5, performs a protocol conversion to pass the connection request from the PC terminal 16 to the portable telephone terminal 13 to be accessed (S6).

According to the present embodiment, the data structure having a field indicating a host name is not required in the database 14, and the gateway machine 12 can solve the name using the field of the mail account name of the database 14. In addition, since the mail account name can be used as a host name, the host name can be set by a user.

Second Embodiment

In the network system according to the present embodiment in which communications can be performed by specifying a specific portable telephone terminal in a mobile communication network using an FQDN from a terminal in an external network, the name solving system in which a gate machine acquires the directory name of the FQDN (that is, the mail account) and the FQDN is read (the name is solved) into the address in the mobile communication network on the basis of the mail account when the address of a portable telephone terminal is assigned (addressing in the form (path notation) of "specific machine name, domain name/directory name" for each portable terminal, and the directory name for each portable terminal is the same as the account name (before @) of the mail address assigned to the portable telephone terminal is described.

In the present embodiment, the host name specified as the address of the FQDN in the first embodiment is replaced with the directory name.

Figure 6:
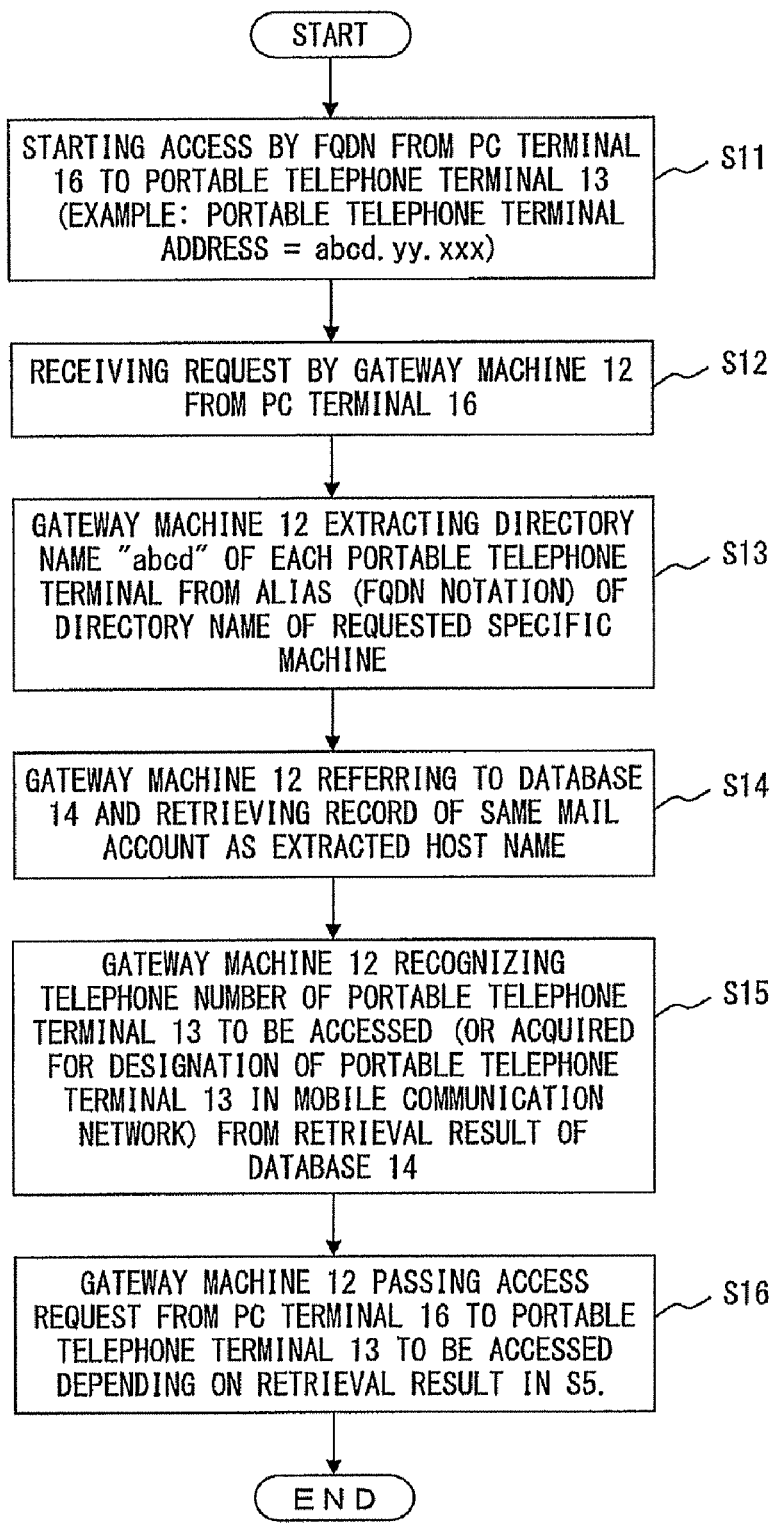
FIG. 6 is a flow chart of the name solving process according to the second embodiment.

FIG. 6 is a flow chart of the name solving process according to the present embodiment. S11 through S16 respectively correspond to S1 through S6 in FIG. 5. In the present embodiment, the address (FQDN notation) of the portable telephone terminal 13 is assigned as the alias of the directory name of a specific machine. Therefore, the present embodiment is different from the first embodiment in that the address of the portable telephone terminal 13 specified by the FQDN in the PC terminal 16 in S11 is "yy.xxx/abcd", and the directory name of each portable telephone terminal is extracted from the alias (path notation) in S13. Since the subsequent steps are the same as those illustrated in FIG. 5, the descriptions are omitted here.

In the present embodiment, when the address of the portable telephone terminal is specified by the FQDN, the host name can be replaced with the directory name.

Third Embodiment

In the network system according to the present embodiment in which communications can be performed by specifying a specific portable telephone terminal in a mobile communication network using an FQDN from a terminal in an external network, the name solving system in which the mail account is determined from the host name of the FQDN by a gateway machine and the FQDN is read (the name is solved) into the address in the mobile communication network on the basis of the mail account when the host name (machine name) of the portable telephone terminal is uniquely generated from the mail account name assigned to the portable telephone terminal is described below.

Figure 7:
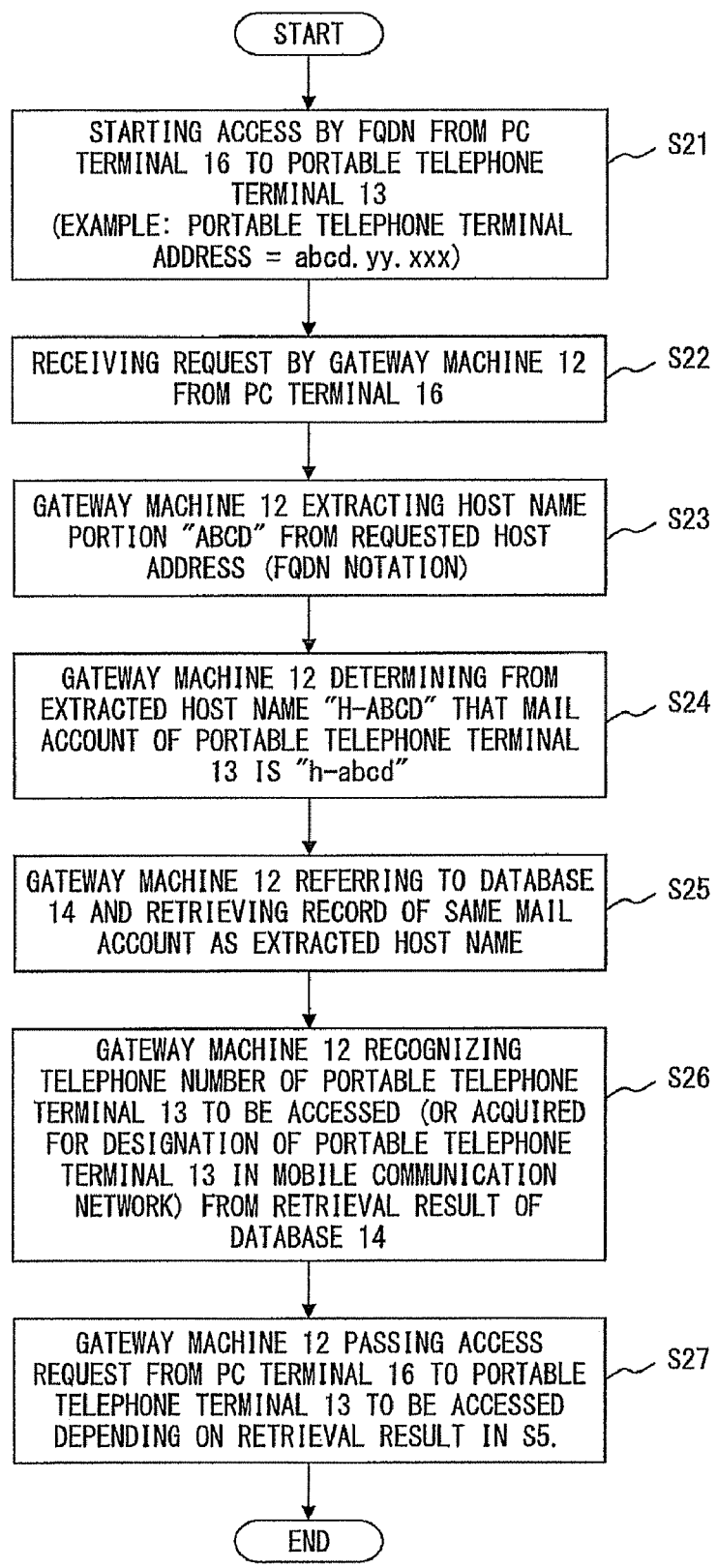
FIG. 7 is a flow chart of the name solving process according to the third embodiment.

FIG. 7 is a flow chart of the name solving process according to the present embodiment. In FIG. 7, first, the PC terminal 16 connected to the Internet 15 accesses (A) the portable telephone terminal 13 in the mobile communication network 11 by specifying the address ("h-abcd.yy.xxx") of the portable telephone terminal 13 by specifying the FQDN (S21).

Then, the DNS (domain name system) server in the Internet 15 solves the name of the domain, and the PC terminal 16 is connected to the gateway machine 12. Then, the gateway machine 12 receives a connection request from the PC terminal 16 (S22).

The gateway machine 12 extracts the host name "h-abcd-"from the FQDN-specified address ("h-abcd.yy.xxx") in the connection request from the PC terminal 16 (S23).

The gateway machine 12 determines the leading "h-" of the extracted host name "h-abcd" as a predetermined character string, and determines the remaining character string "abcd" as the mail account of the portable telephone terminal (S24). In the present embodiment, "h-" is registered as a predetermined character string in advance in the gateway machine 12.

Then, the gateway machine 12 refers to the database 14 (arrow (B)), and retrieves the record of the mail account which is the same as the character string "abcd" determined in S23 (S25).

Then, the gateway machine 12 recognizes the telephone number (or the address for determination of the portable telephone terminal 13 in the mobile communication network 11) of the portable telephone terminal to be accessed from the retrieval result (S26). For example, the gateway machine 12 acquires the telephone number corresponding to the mail account name from the record retrieved using the mail account name "abcd" as a key. Thus, the address to be used in the mobile communication network 11 can be read from the host name extracted from the FQDN-specified address.

Then, the gateway machine 12 makes a connection to the portable telephone terminal 13 to be accessed on the basis of the telephone number (or an address for designation of the portable telephone terminal 13 in the mobile communication network 11) acquired in S26, performs a protocol conversion, and passes the connection request from the PC terminal 16 to the portable telephone terminal 13 to be accessed (S27).

According to the present embodiment, the gateway machine 12 extracts the host name h-abcd from the FQDN-specified address in the connection request from the PC terminal 16, and can determine that the mail account of the host is abcd, and solves the name using the field of the mail account name in the database 14.

Fourth Embodiment

In the network system according to the present embodiment in which communications can be performed by specifying a specific portable telephone terminal in a mobile communication network using an FQDN from a terminal in an external network, the name solving system in which a mail account is determined from the directory name (that is, the mail account) of the FQDN by a gateway machine, and the FQDN is read (the name is solved) into the address in the mobile communication network on the basis of the mail account when the address of the portable telephone terminal is assigned as an alias of the directory name of a specific machine (the address is specified in the form (path notation) of "specific machine name.domain name/directory name for each portable terminal"), and the directory name (machine name) of the portable telephone terminal is uniquely generated from the mail account name assigned to the portable telephone terminal is described.

In the present embodiment, the host name specified as the address of the FQDN in the third embodiment is replaced with the directory name.

FIG. 8 is a flow chart of the name solving process according to the present embodiment. S31 through S37 respectively correspond to S21 through S27 in FIG. 7. In the present embodiment, the address (FQDN notation) of the portable telephone terminal 13 is assigned as the alias of the directory name of a specific machine. Therefore, the present embodiment is different from the third embodiment in that the address of the portable telephone terminal 13 specified by the FQDN in the PC terminal 16 in S31 is "yy.xxx/h-abcd", and the directory name of each portable telephone terminal is extracted from the alias (FQDN notation) in S33. Since the subsequent steps are the same as those illustrated in FIG. 8, the descriptions are omitted here.

In the present embodiment, when the address of the portable telephone terminal is specified by the FQDN, the host name can be replaced with the directory name.

Other Embodiments

It is possible to automatically generate a unique host name from the existing unique information in the database, and automatically add a host name or a directory name field to a record (in this case, as with the prior art technology, the gateway machine uses the host name or the directory name field when the name is solved).

In the network system according to the present embodiment (1) in which communications can be performed by specifying a specific portable telephone terminal in a mobile communication network using an FQDN from a terminal in an external network, a host name or a directory name is generated from the account name of the mail address assigned to the portable telephone terminal using any of the following two methods.

(1) The host name field generating system of uniquely generating the host name (machine name) of the portable telephone terminal from the account name of the mail address assigned to the portable telephone terminal, adding a host name field to the existing record in the database, and storing the generated host name in the host name field.

(2) The directory name field generating system of uniquely generating a directory name from the account name of the mail address assigned to the portable telephone terminal, adding the directory name field to the existing record of the database, and storing the generated directory name in the directory name field when the address (FQDN notation) of the portable telephone terminal is assigned as an alias of the directory name of a specific machine (when the address is specified in the form of "specific machine name.domain name/directory name of each portable terminal").

FIG. 9 is an explanatory view of generating a host name (or directory name) field according to the present embodiment. In the example illustrated in FIG. 9, predetermined one or more characters (for example, "h-" etc.) are equally added to all of the existing mail account names to generate a host name (or a directory name), a host name (or a directory name) field is added to the existing record, and the generated host name (or the directory name) is stored in the host name (or directory name) field.

Figure 10:
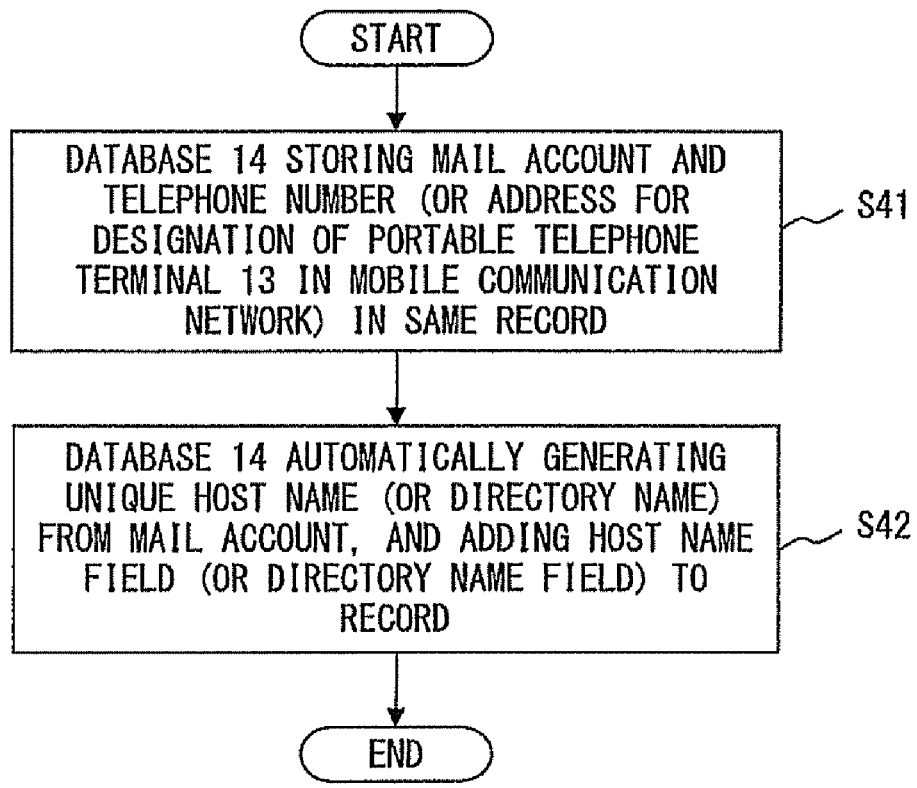
FIG. 10 is a flow chart of automatically generating a host name field (or directory name field) from the mail account according to other embodiments.

FIG. 10 is a flow chart of automatically generating a host name field (or directory name field) from the mail account according to the present embodiment. First, the database 14 stores a mail account and a telephone number (or an address for designation of the portable telephone terminal in the mobile communication network) corresponding to the mail account in the same record (refer to FIG. 9) (S41).

The DB server of the database 14 automatically generates a unique host name (or a directory name) from the mail account, adds a host name field (or a directory name field) to the record storing the mail account, and stores the generated host name (or directory name) in the field (S42).

In the present embodiment, when a host name (directory name) field is separately provided in the database, the host name (directory name) stored in the field can be uniquely and automatically generated by the DB server of a database 42 from a mail account stored in advance in the database 14.

Figure 11:
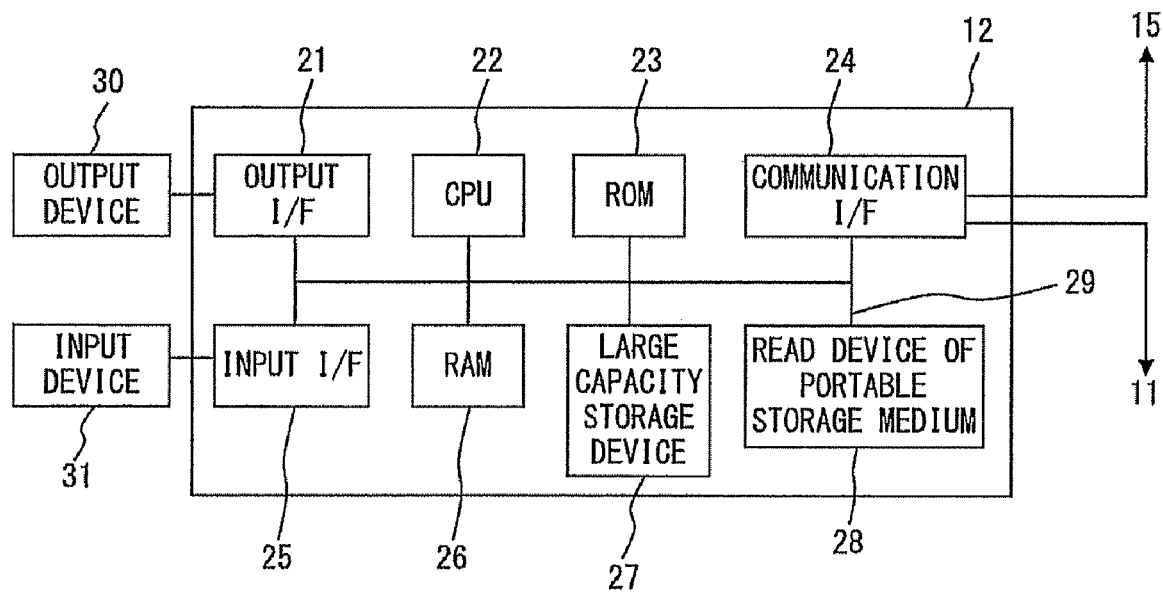
FIG. 11 is a block diagram of the configuration of the hardware environment of a gateway machine 12 according to the first through fourth embodiments of the present invention.

FIG. 11 is a block diagram of the configuration of the hardware environment of a gateway machine 12 according to the first through fourth embodiments of the present invention. In FIG. 11, the gateway machine 12 is configured by a CPU 22, read only memory (ROM) 23, random access memory (RAM) 26, a communication interface (hereinafter referred to as an I/F) 24, a large capacity storage device 27, an output I/F 21, an input I/F 25, a read device 28 of a non-transitory portable storage medium, a bus 29 connecting all of the components, an output device 30 connected to the output I/F 21, and an input device 31 connected to the input I/F 25.

The large capacity storage device 27 can be storage devices in various forms such as a hard disk, a magnetic disk, a flash memory, etc. The large capacity storage device 27 of the ROM 23 store a program of a control process described by the flow chart according to the above-mentioned embodiments. The large capacity storage device 27 stores the program according to the above-mentioned embodiment. The program is read and executed by the CPU 22.

A non-transitory portable storage medium can be non-transitory storage media in various forms such as CD-ROM, DVD-ROM, a flexible disk, an optical disk, a magneto optical disk, an IC card, etc., and the program stored in such a non-transitory storage medium is read by the read device 28.

The communication I/F 24 is connected to the mobile communication network 11 and the Internet 15. The communication I/F 24 can be connected to a network other than the Internet such as a LAN, a WAN, a dedicated line, a cable, a radio, a public line, a mobile communication network of other domains, etc.

According to the present invention, a system capable of accessing a portable telephone terminal in a mobile communication network from an external network by specifying an FQDN can solve the name from the FQDN to the address in the mobile communication network of the portable telephone terminal without newly adding a host name field or a directory name field to a database.

Since a host name uniquely generated from existing data is used when a new field of a host name is added, the number of prepared steps (to change a database, to transmit a notification to a user, etc.) can be reduced when FQDN-specified access is served.

Since the external network user at an accessing network can easily generate a host name from the mail address of a portable telephone terminal, a service can be smoothly used and a user can set any name easily recognized by the user and use the name as a host name.

The present invention is not limited to the above-mentioned embodiments, but can be can be configured in various forms or aspects within the scope of the gist of the present invention.

What is claimed is:

1. A communication control system which intervenes in a communication between an external terminal in an external network and a portable telephone terminal with an electronic mail transmission/reception function which operates as a mobile communication terminal in a mobile communication network, comprising:

an access request acquisition device designating a location of the mobile communication terminal to be accessed in the mobile communication network from the external terminal to the mobile communication terminal by acquiring an access request by a fully qualified domain name (FQDN) in which location information including a name of the mobile communication terminal is specified;

a memory device storing the FQDN;

a mobile communication terminal name extraction device extracting the name of the mobile communication terminal from the FQDN stored in the memory device;

a name solving device solving the name of the mobile communication terminal on a basis of the extracted name of the mobile communication terminal;

an access destination communication device connecting communications to the mobile communication terminal according to address information acquired by solving the name; and a mobile communication terminal-related information storage device storing a mail account name of electronic mail of the mobile communication terminal and a telephone number of the mobile communication terminal corresponding to the mail account name, wherein when a setting condition is that the FQDN is information specified by a directory name of a predetermined device described in path notation, and the name of the mobile communication terminal is the same as the mail account name corresponding to the name of the mobile communication terminal, the mobile communication terminal name extraction device extracts a lowest order directory name of the path as the name of the mobile communication terminal, and the name solving device acquires the telephone number corresponding to the name of the mobile communication terminal extracted from the mobile communication terminal-related information storage device as the address information.

2. A communication control system which intervenes in a communication between an external terminal in an external network and a portable telephone terminal with an electronic mail transmission/reception function which operates as a mobile communication terminal in a mobile communication network, comprising:

an access request acquisition device designating a location of the mobile communication terminal to be accessed in the mobile communication network from the external terminal to the predetermined mobile communication terminal by acquiring an access request by a fully qualified domain name (FQDN) in which location information including a name of the mobile communication terminal is specified;

a memory device storing the FQDN;

a mobile communication terminal name extraction device extracting the name of the mobile communication terminal from the FQDN stored in the memory device;

a name solving device solving the name of the mobile communication terminal on a basis of the extracted name of the mobile communication terminal;

an access destination communication device connecting communications to the mobile communication terminal according to address information acquired by solving the name; and a mobile communication terminal-related information storage device storing a mail account name of electronic mail of the mobile communication terminal and a telephone number of the mobile communication terminal corresponding to the mail account name, wherein when the name of the mobile communication terminal is assigned one or more predetermined characters to the mail account name corresponding to the name of the mobile communication terminal, the mobile communication terminal name extraction device extracts the host name of the FQDN as the name of the mobile communication terminal; and the name solving device removes the characters from the extracted name of the mobile communication terminal, sets remaining characters as the mail account name, and acquires the telephone number corresponding to the mail account name as the address information from the mobile communication terminal-related information storage device.

3. A communication control system which intervenes in a communication between an external terminal in an external network and a portable telephone terminal with an electronic mail transmission/reception function which operates as a mobile communication terminal in a mobile communication network, comprising:

an access request acquisition device designating a location of the mobile communication terminal to be accessed in the mobile communication network from the external terminal to the predetermined mobile communication terminal by acquiring an access request by a fully qualified domain name (FQDN) in which location information including a name of the mobile communication terminal is specified;

a memory device storing the FQDN;

a mobile communication terminal name extraction device extracting the name of the mobile communication terminal from the FQDN stored in the memory device;

a name solving device solving the name of the mobile communication terminal on a basis of the extracted name of the mobile communication terminal;

an access destination communication device connecting communications to the mobile communication terminal according to address information acquired by solving the name; and a mobile communication terminal-related information storage device storing a mail account name of electronic mail of the mobile communication terminal and a telephone number of the mobile communication terminal corresponding to the mail account name, wherein when the FQDN is information specified by a directory name of a predetermined device described in path notation and the name of the mobile communication terminal is assigned one or more predetermined characters to the mail account name corresponding to the mobile communication terminal, the mobile communication terminal name extraction device extracts a lowest order directory name of the path as the name of the mobile communication terminal, and the name solving device removes the characters from the extracted name of the mobile communication terminal, sets remaining characters as the mail account name, and acquires the telephone number corresponding to the mail account name as the address information from the mobile communication terminal-related information storage device.

4. A non-transitory computer-readable portable storage medium, on which is stored a communication control program for enabling a computer to execute a communication control process of intervening in a communication between an external terminal in an external network and a portable telephone terminal with an electronic mail transmission/reception function which operates as a mobile communication terminal in a mobile communication network, the communication control process comprising:
  an access request acquiring process of designating a location of the mobile communication terminal to be accessed in the mobile communication network from the external terminal to the predetermined mobile communication terminal by acquiring an access request by a fully qualified domain name (FQDN) in which location information including a name of the mobile communication terminal is specified;
  a storing process of storing the FQDN in a memory device;
  a mobile communication terminal name extracting process of extracting the name of the mobile communication terminal from the FQDN stored in the memory device;
  a name solving process of solving the name of the mobile communication terminal on a basis of the extracted name of the mobile communication terminal; and
  an access destination communication process of connecting communications to the mobile communication terminal according to address information acquired by solving the name, wherein
  the name solving process refers to a database storing a mail account name of electronic mail of the mobile communication terminal and a telephone number of the mobile communication terminal corresponding to the mail account name, and solves the name of the mobile communication terminal,
  when a setting condition is that the FQDN is information specified by a directory name of a predetermined device described in path notation, and the name of the mobile communication terminal is the same as the mail account name corresponding to the name of the mobile communication terminal, the mobile communication terminal name extracting process extracts a lowest order directory name of the path as the name of the mobile communication terminal, and the name solving process acquires the telephone number corresponding to the name of the mobile communication terminal extracted from the database as the address information.

5. A non-transitory computer-readable portable storage medium, on which is stored a communication control program for enabling a computer to execute a communication control process of intervening in a communication between an external terminal in an external network and a portable telephone terminal with an electronic mail transmission/reception function which operates as a mobile communication terminal in a mobile communication network, the communication control process comprising:
  an access request acquiring process of designating a location of the mobile communication terminal to be accessed in the mobile communication network from the external terminal to the predetermined mobile communication terminal by acquiring an access request by a fully qualified domain name (FQDN) in which location information including a name of the mobile communication terminal is specified;
  a storing process of storing the FQDN in a memory device;
  a mobile communication terminal name extracting process of extracting the name of the mobile communication terminal from the FQDN stored in the memory device;
  a name solving process of solving the name of the mobile communication terminal on a basis of the extracted name of the mobile communication terminal; and
  an access destination communication process of connecting communications to the mobile communication terminal according to address information acquired by solving the name, wherein
  the name solving process refers to a database storing a mail account name of electronic mail of the mobile communication terminal and a telephone number of the mobile communication terminal corresponding to the mail account name, and solves the name of the mobile communication terminal,
  when the name of the mobile communication terminal is assigned one or more predetermined characters to the mail account name corresponding to the name of the mobile communication terminal,
  the mobile communication terminal name extracting process extracts the host name of the FQDN as the name of the mobile communication terminal, and
  the name solving process removes the characters from the extracted name of the mobile communication terminal, sets remaining characters as the mail account name, and acquires the telephone number corresponding to the mail account name as the address information from the database.

6. A non-transitory computer-readable portable storage medium, on which is stored a communication control program for enabling a computer to execute a communication control process of intervening in a communication between an external terminal in an external network and a portable telephone terminal with an electronic mail transmission/reception function which operates as a mobile communication terminal in a mobile communication network, the communication control process comprising:
  an access request acquiring process of designating a location of the mobile communication terminal to be accessed in the mobile communication network from the external terminal to the predetermined mobile communication terminal by acquiring an access request by a fully qualified domain name (FQDN) in which location information including a name of the mobile communication terminal is specified;
  a storing process of storing the FQDN in a memory device;
  a mobile communication terminal name extracting process of extracting the name of the mobile communication terminal from the FQDN stored in the memory device;
  a name solving process of solving the name of the mobile communication terminal on a basis of the extracted name of the mobile communication terminal; and
  an access destination communication process of connecting communications to the mobile communication terminal according to address information acquired by solving the name, wherein
  the name solving process refers to a database storing a mail account name of electronic mail of the mobile communication terminal and a telephone number of the mobile communication terminal corresponding to the mail account name, and solves the name of the mobile communication terminal,
  when the FQDN is information specified by a directory name of a predetermined device described in path notation and the name of the mobile communication terminal is assigned one or more predetermined characters to the mail account name corresponding to the mobile communication terminal, the mobile communication terminal name extracting process extracts a lowest order directory name of the path as the name of the mobile communication terminal, and the name solving process removes the characters from the extracted name of the mobile communication terminal, acquires the mail account name, and sets remaining characters as the telephone number corresponding to the mail account name as the address information from the database.

7. A communication control method for intervening in a communication between an external terminal in an external network and a portable telephone terminal with an electronic mail transmission/reception function which operates as a mobile communication terminal in a mobile communication network, comprising:

acquiring an access request by a fully qualified domain name (FQDN) in which location name information for designating a location name of the mobile communication terminal to be accessed in the mobile communication network from the external terminal to the predetermined mobile communication terminal is specified;

extracting the name of the mobile communication terminal from the FQDN;

solving the name on a basis of the extracted name of the mobile communication terminal; and connecting communications to the mobile communication terminal according to address information acquired by solving the name, wherein when the name is solved, the name of the mobile communication terminal is solved by referring to a database storing the mail account name of the electronic mail and the telephone number of the mobile communication terminal corresponding to the mail account name, wherein when a setting condition is that the FQDN is information specified by a directory name of a predetermined device described in path notation, and the name of the mobile communication terminal is the same as the mail account name corresponding to the name of the mobile communication terminal in the communication control method, a lowest order directory name of the path is extracted as the name of the mobile communication terminal when the name of the mobile communication terminal is extracted, and the telephone number corresponding to the name of the mobile communication terminal extracted from the database is acquired as the address information.

8. A communication control method for intervening in a communication between an external terminal in an external network and a portable telephone terminal with an electronic mail transmission/reception function which operates as a mobile communication terminal in a mobile communication network, comprising:

acquiring an access request by a fully qualified domain name (FQDN) in which location name information for designating a location name of the mobile communication terminal to be accessed in the mobile communication network from the external terminal to the predetermined mobile communication terminal is specified;

extracting the name of the mobile communication terminal from the FQDN;

solving the name on a basis of the extracted name of the mobile communication terminal; and connecting communications to the mobile communication terminal according to address information acquired by solving the name, wherein when the name is solved, the name of the mobile communication terminal is solved by referring to a database storing the mail account name of the electronic mail and the telephone number of the mobile communication terminal corresponding to the mail account name, wherein when the name of the mobile communication terminal is assigned one or more predetermined characters to the mail account name corresponding to the name of the mobile communication terminal in the communication control method, the host name of the FQDN is extracted as the name of the mobile communication terminal when the name of the mobile communication terminal is extracted, and when the name is solved, the characters are removed from the extracted name of the mobile communication terminal, remaining characters are set as the mail account names, and the telephone number corresponding to the mail account name is acquired as the address information from the database.

9. A communication control method for intervening in a communication between an external terminal in an external network and a portable telephone terminal with an electronic mail transmission/reception function which operates as a mobile communication terminal in a mobile communication network, comprising:

acquiring an access request by a fully qualified domain name (FQDN) in which location name information for designating a location name of the mobile communication terminal to be accessed in the mobile communication network from the external terminal to the predetermined mobile communication terminal is specified;

extracting the name of the mobile communication terminal from the FQDN;

solving the name on a basis of the extracted name of the mobile communication terminal; and connecting communications to the mobile communication terminal according to address information acquired by solving the name, wherein when the name is solved, the name of the mobile communication terminal is solved by referring to a database storing the mail account name of the electronic mail and the telephone number of the mobile communication terminal corresponding to the mail account name, wherein when the FQDN is information specified by a directory name of a predetermined device described in path notation and the name of the mobile communication terminal is assigned one or more predetermined characters to the mail account name corresponding to the mobile communication terminal in the communication control method, the lowest order directory name of the path is extracted as the name of the mobile communication terminal when the name of the mobile communication terminal is extracted, and when the name is solved, the characters are removed from the extracted name of the mobile communication terminal, remaining characters are set as the mail account names, and the telephone number corresponding to the mail account name is acquired as the address information from the database.

* * * * *

UNITED STATES PATENT AND TRADEMARK OFFICE
CERTIFICATE OF CORRECTION

| | | |
|---|---|---|
| PATENT NO. | : 8,073,957 B2 | Page 1 of 1 |
| APPLICATION NO. | : 12/506522 | |
| DATED | : December 6, 2011 | |
| INVENTOR(S) | : Hiroyuki Nagatani | |

It is certified that error appears in the above-identified patent and that said Letters Patent is hereby corrected as shown below:

Column 16, Line 19, In Claim 8, delete "names," and insert -- name, --, therefor.

Column 16, Line 60, In Claim 9, delete "names," and insert -- name, --, therefor.

Signed and Sealed this
Twenty-eighth Day of February, 2012

David J. Kappos
*Director of the United States Patent and Trademark Office*